United States Patent [19]

Müller

[11] Patent Number: 5,674,946

[45] Date of Patent: Oct. 7, 1997

[54] EPOXY DERIVATIVES OF POLYACRYLAMIDES

[75] Inventor: Egbert Müller, Erzhausen, Germany

[73] Assignee: Merck Patent Gesellschaft mit beschrankter Haftung, Darmstadt, Germany

[21] Appl. No.: 624,477

[22] PCT Filed: Sep. 24, 1994

[86] PCT No.: PCT/EP94/03196

§ 371 Date: Apr. 3, 1996

§ 102(e) Date: Apr. 3, 1996

[87] PCT Pub. No.: WO95/10354

PCT Pub. Date: Apr. 20, 1995

[30] Foreign Application Priority Data

Oct. 8, 1993 [DE] Germany ............. 43 34 359.7

[51] Int. Cl.[6] ............ C08F 291/08; B01D 20/32; C08L 51/00
[52] U.S. Cl. ............ 525/286; 525/54.3; 525/59; 525/296; 210/656; 210/660; 210/679; 210/690; 210/692; 436/529; 436/530; 436/531; 435/179; 435/181
[58] Field of Search ............ 525/54.3, 59, 286, 525/296; 436/529, 530, 531; 435/179, 181; 210/656, 660, 679, 690, 692

[56] References Cited

U.S. PATENT DOCUMENTS 4,756,834  7/1988  Muller ............... 210/635

4,914,159  4/1990  Bomer ............... 525/328.2
5,096,971  3/1992  Nishikaji ............... 525/278
5,519,064  5/1996  Stringfield ............... 521/54

FOREIGN PATENT DOCUMENTS 2631849  1/1989  France .

*Primary Examiner*—Irina S. Zemel
*Attorney, Agent, or Firm*—Millen, White, Zelano & Branigan, P.C.

[57] ABSTRACT

The invention relates to activated support materials which comprise epoxy-substituted poly(meth)acrylamides, characterized in that:

a) the base support contains aliphatic hydroxyl groups, b) the covalently bonded polymers are bonded to the support via a terminal monomer unit, c) the polymers contain monomer units of the formula I, d) the monomer units are linearly linked,

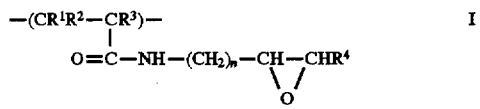

in which $R^1$, $R^2$ and $R^3$ independently of one another are H or $CH_3$, $R^4$ is H or alkyl having 1–5 carbon atoms and n is an integer between 1 and 5 and to the use thereof.

13 Claims, No Drawings

EPOXY DERIVATIVES OF POLYACRYLAMIDES

The invention relates to activated support materials which comprise epoxy-substituted poly(meth)acrylamides, and to the use thereof.

BACKGROUND OF THE INVENTION

Activated support materials are important intermediates in the preparation of support materials for affinity chromatography and for the immobilization of enzymes. In polymer-analogous reactions, furthermore, it is possible to use activated support materials to prepare separating materials for ion exchange chromatography, hydrophobic interaction chromatography, gel permeation chromatography and metal chelate chromatography.

Activated support materials derived from epoxy derivatives of crosslinked poly(meth)acrylates are known. These materials, however, have disadvantages owing to their rigid structure. German Patent Application DE 43 10 964 describes noncrosslinked graft polymers based on epoxy (meth)acrylates. The present invention additionally provides noncrosslinked graft polymers based on epoxy-substituted poly(meth)acrylamides.

SUMMARY OF THE INVENTION

The invention relates to activated support materials based on hydroxyl-containing base supports on whose surfaces polymers are covalently bonded, characterized in that a) the base support contains aliphatic hydroxyl groups, b) the covalently bonded polymers are bonded to the support via a terminal monomer unit, c) the polymers contain monomer units of the formula I, d) the monomer units are linearly linked,

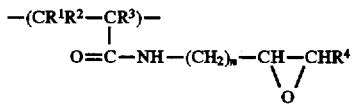

in which $R^1$, $R^2$ and $R^3$ independently of one another are H or $CH_3$, $R^4$ is H or alkyl having 1–5 carbon atoms
and n is an integer between 1 and 5.

The invention relates to processes for the preparation of activated support materials based on hydroxyl-containing base supports on whose surfaces polymers are covalently bonded by graft polymerization, characterized by the process steps of a) acryloylation of a chlorohydrin-containing alkyl-amine of the formula II

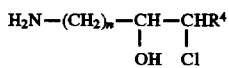

in which $R^4$ is H or alkyl having 1–5 carbon atoms
and n is an integer between 1 and 5;

b) graft polymerization of the monomers from step a) onto a hydroxyl-containing base support particle in the presence of cerium(IV) ions; and c) reaction of the chlorohydrin radical to the epoxide.

The invention also relates to the use of an activated support material according to the invention for the preparation of chromatographic separating materials and for the immobilization of enzymes.

The invention relates to processes for the preparation of chromatographic separating materials, characterized in that separation effectors are bonded to activated support materials according to the invention, and to the chromatographic separating materials prepared by these processes.

The invention relates to processes for the preparation of immobilized enzymes, characterized in that enzymes are bonded to activated support materials according to the invention, and to the immobilized enzymes prepared by these processes.

The chlorohydrin-containing alkylamines of the formula II are, where not commercially obtainable, accessible to the person skilled in the art by customary processes. The examples describe one process variant.

Process variants suitable for the acryloylation of the alkylamines of the formula II are familiar to the person skilled in the art. A suitable reaction, for example, is that of Schotten-Baumann and its variants. The acrylic or methacrylic acid derivative employed is preferably the acid chloride. Other suitable derivatives are familiar to the person skilled in the art, examples being the acid azides or anhydrides. Acryloylation is preferably carried out in the presence of a polymerization inhibitor.

Base supports in the context of the present invention are particles, but also materials in the form of membranes or filaments, and also netlike, tissuelike or spongelike materials, on which polymers are grafted. Base supports which can be employed are in general customary, porous or nonporous, support particles, provided they have primary or secondary aliphatic hydroxyl groups at their surface, or can have aliphatic hydroxyl groups introduced into them by methods which are known per se. Suitable supports include, inter alia, agarose-based polysaccharides, cellulose, cellulose derivatives and polymers based on dextran. Preference is given to polyvinyl alcohol-based polymers or copolymers of (meth)acrylate derivatives and comonomers containing aliphatic hydroxyl groups. Particular preference is given to diol-modified silica gels as base supports, and to polyvinyl-based copolymers containing aliphatic hydroxyl groups. Base supports of this kind are commercially obtainable; examples are Fractogel® TSK HW 65 (S) (E. Merck), a porous, vinyl-based copolymer containing aliphatic hydroxyl groups (1 meq of OH/g), and LiChrospher® DIOL (E. Merck), a diol-substituted silica gel likewise containing aliphatic hydroxyl groups.

The graft polymerization of the substituted acrylamides onto the base support is initiated with cerium(IV) ions, as described by G. Mino and S. Kaizerman (1958) (J. Polymer Science 31, 242–243) and by G. Mino et al. (1959) (J. Polymer Science 38, 393–401). The graft polymerization of Mino and Kaizerman is carried out by known processes in purely aqueous solution acidified with nitric acid. Consequently, this reaction can only be carried out with readily water-soluble monomers. It has been found, however, that the reaction of cerium(IV) salts is also possible if the solvent used is a mixture of water and organic solvents which do not contain hydroxyl groups. Particularly preferred in this context are dioxane and tetrahydrofuran. The proportion of organic solvent in the reaction mixture is preferably 10–80% by volume, particularly preferably 20–50% by volume.

The reaction of chlorohydrin to the epoxide takes place by processes which are familiar to the person skilled in the art.

For the interaction between analyte and chromatographic separating material, separation effectors are required. The person skilled in the art knows a large number of separation effectors which he or she will select in accordance with the chromatographic separation method. Examples of such separation methods are ion exchange chromatography, gel permeation chromatography, hydrophobic interaction chromatography and affinity chromatography.

Separation effectors which are known for ion exchange chromatography are ionic groups such as, for example, quaternary ammonium alkyl groups and the $SO_3^-$ group, and ionogenic groups which form ions under certain pH conditions. The latter group includes, for example, the alkylated amino groups and also the carboxyl and phosphoric acid group.

Customary separation effectors for hydrophobic interaction chromatography are uncharged hydrophobic separation effectors such as, for example, $C_1$–$C_{20}$-alkyl, $C_6$–$C_{25}$-aryl, $C_7$–$C_{25}$-alkylaryl or $C_7$–$C_{25}$-arylalkyl, which can also be derivatized one or more times with nitrile or $C_1$–$C_5$-alkoxy; it is also possible for one or more non-adjacent $CH_2$ groups to be replaced by NH or O or else for one or more CH groups to be replaced by N; further examples are polyoxyethylene or polyoxypropylene derivatives $[(CH_2)_m$—O—$]_o$—$R^9$, in which m is 2 or 3, o is an integer between 1 and 200 and $R^9$ is H or $C_1$–$C_5$-alkyl. Particular preference is given to radicals of moderate or low hydrophobicity.

For affinity chromatography, the person skilled in the art knows of very many affinity ligands, each of which undergoes a structurally defined bond with the analyte, and which are suitable as separation effectors, examples being:

| Affinity ligand | Analyte (Example) |
| --- | --- |
| Protein A | Immunoglobulins |
| Concanavalin A | Glycoproteins |
| Biotin | Avadin/Streptavidin |
| Avidin | Biotin |
| Streptavidin | Biotin |
| 5'-Adenosine monophosphate | NAD-dependent oxidoreductases |
| 2',5'-Adenosine diphosphate | NADP-dependent oxidoreductases |
| Aminoacridin | RNA or DNA |
| Boronic acid | Catecholamines |
| Boronic acid | Glycosylated haemoglobin |
| Iminodiacetic acid | Metalloproteins |
| "Thiophilic" ligands | Immunoglobulins |
| Cibacron blue | Monoclonal antibodies |

The separation effectors can be introduced by reaction with the active epoxide group of the activated support material, to form a chromatographic separating material for the particular application which is pre-determined by the separation effector used. Suitable reactions are known in principle; they include, for example:

a) the reaction with sulfurous acid or its salts or with primary, secondary or tertiary amines, to give ionic exchangers;

b) the reaction with alcohols, phenols or primary amines, to give hydrophobic separating materials;

c) the reaction with iminodiacetic acid or the introduction of thiophilic ligands, or other affinity ligands such as protein A, to give supports for affinity chromatography.

Even without further statements, it is assumed that a person skilled in the art will be able to utilize the above description in the widest context. The preferred embodiments, therefore, are to be interpreted merely as descriptive and in no way as a disclosure which is in any sense limiting.

The complete disclosure of all applications, patents and publications mentioned above and below, and the corresponding application DE 43 34 359 filed on Oct. 8, 1993, are incorporated into this application by reference.

The examples which follow serve to illustrate the invention and place no restriction on it.

EXAMPLES

Example 1

Synthesis of a chlorohydrin derivative of the acrylamide

Step 1

60 g of dry potassium phthalimide and 120 g of 1,3-dichlorohydrin are heated at reflux to 200° C. over the course of 6 hours. The reaction product is subsequently extracted by boiling with water. The water is subsequently removed under reduced pressure on a rotary evaporator, and the residue is used directly for the subsequent synthesis step.

Step 2

30 g of the reaction product from step 1 are heated at 60° C. for 2 hours in a solution of 50% hydrazine hydrate and 50% ethanol. Subsequently, 100 ml of 1 M hydrochloric acid are added and the mixture is then again heated at 60° C. for 2 hours. The phthalic acid hydrazide precipitates and is filtered off. The filtrate is subsequently concentrated under reduced pressure on a rotary evaporator. The reaction product is then taken up in 100 ml of 1 M sodium hydroxide solution. The resulting solution is used for the subsequent synthesis step.

Step 3

20 ml of acryloyl chloride are added dropwise, with ice cooling and stirring, to the solution from step 2. The mixture is subsequently stirred for a further 2 hours.

Example 2

Graft polymerization of a chlorohydrin derivative of the acrylamide

The solution from step 3 of Example 1 is added to 50 ml of water-moist Fractogel® TSK HW 65 (S) (E. Merck). The reaction solution is stirred at 150 rpm. Then the initiator solution is added (3 g of ammonium cerium(IV) nitrate +3 g of concentrated nitric acid in 25 ml of water). Polymerization is terminated after 3 hours and the gel is washed with dilute sulfuric acid in 1 M sodium hydroxide solution.

Example 3

Polymer-analogous reaction to give the oxirane derivative

To convert the polymer of the chlorohydrin derivative to the corresponding oxirane derivative, the gel prepared according to Example 2 is stirred at 60° C. for 5 hours in 1 M sodium hydroxide solution. After cooling, the gel is washed to neutrality.

The content of oxirane groups (determined by titration with perchloric acid) is 0.5 mmol/g of gel.

I claim:

1. An activated support material comprising a base support having polymer covalently bonded to a surface thereof, wherein a) the base support contains aliphatic hydroxyl groups b) the polymer is covalently bonded to the support via a terminal monomer unit, c) the polymer contains monomer units of the formula I having an epoxide group,

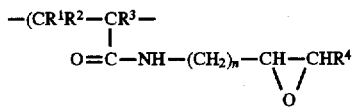

in which

R¹, R² and R³ independently of one another are H or CH₃,

R⁴ is H or alkyl having 1–5 carbon atoms and n is an integer between 1 and 5, and d) the monomer units are linearly linked.

2. A process for the preparation of an activated support material, comprising a base support having polymer covalently bonded by graft polymerization to a surface thereof, comprising:

a) acryloylating a chlorohydrin-containing alkyl-amine of the formula II

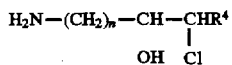

in which

R⁴ is H or alkyl having 1–5 carbon atoms and n is an integer between 1 and 5, to provide monomers;

b) graft polymerizing the monomers from a) onto a hydroxyl-containing base support particle in the presence of cerium(V) ions; and c) reacting the chlorohydrin radicals to convert them to epoxide groups.

3. A process for preparation of a chromatographic separating material which comprises reacting a chromatographic separation effector with the epoxide group of an activated support material of claim 1.

4. A chromatographic separating material prepared by the process of claim 3.

5. A chromatographic separating material comprising a chromatographic separation effector bonded to an activated support material of claim 1.

6. A process for immobilizing an enzyme which comprises reacting the enzyme with the epoxide group of an activated support material of claim 1.

7. An immobilized enzyme prepared by the process of claim 6.

8. An immobilized enzyme comprising an enzyme bonded to an activated support material of claim 1.

9. The activated support material of claim 1, wherein the base support is an agarose-based polysaccharide, cellulose or a derivative thereof, a dextran polymer, a polyvinyl alcohol polymer or copolymer of a (meth)acrylate, a diol-modified silica gel or a polyvinyl copolymer, each containing aliphatic hydroxyl groups.

10. The chromatographic separating material of claim 5, wherein the chromatographic separation effector is a separation effector for ion exchange chromatography, gel permeation chromatography, hydrophobic interaction chromatography or affinity chromatography.

11. The process of claim 3, wherein the epoxide group of an activated support material is reacted with sulfurous acid or a salt thereof or with a primary, secondary or tertiary amine to produce an ionic exchange chromatographic separating material.

12. The process of claim 3, wherein the epoxide group of an activated support material is reacted with an alcohol, phenol or primary amine to produce a hydrophobic chromatographic separating material.

13. The process of claim 3, wherein the epoxide group of an activated support material is reacted with iminodiacetic acid, a thiophilic ligand or protein A to produce an affinity chromatographic separating material.

* * * * *